United States Patent [19]

Fuzesi et al.

[11] Patent Number: 4,490,517

[45] Date of Patent: Dec. 25, 1984

[54] SOLID TDI RESIDUE-DICARBOXYLIC ESTER BINDER COMPOSITION AND LIGNOCELLULOSIC COMPOSITE MATERIALS PREPARED THEREFROM

[75] Inventors: Stephen Fuzesi; Robert W. Brown, both of Hamden, Conn.

[73] Assignee: Olin Corporation, Cheshire, Conn.

[21] Appl. No.: 538,705

[22] Filed: Oct. 3, 1983

[51] Int. Cl.$^3$ .................. C08G 18/14; C08G 18/36
[52] U.S. Cl. ............................ 527/401; 527/100; 527/103; 524/13; 524/14; 528/1; 528/66; 156/331.4; 428/243; 428/245; 428/541; 264/125
[58] Field of Search .............. 524/13, 14; 527/100, 527/103, 401; 528/1, 66; 156/331.4; 428/243, 245, 541; 264/125

[56] References Cited

U.S. PATENT DOCUMENTS

| | | | |
|---|---|---|---|
| 4,201,847 | 5/1980 | Kleimann et al. | 521/132 |
| 4,254,228 | 3/1981 | Kleimann et al. | 521/172 |
| 4,279,788 | 7/1981 | Lambuth | 524/27 |
| 4,376,088 | 3/1983 | Prather | 264/109 |
| 4,376,089 | 3/1983 | Bogner et al. | 264/109 |
| 4,376,144 | 3/1983 | Goettler | 524/14 |
| 4,414,361 | 11/1983 | Gaul et al. | 524/735 |

*Primary Examiner*—John Kight
*Assistant Examiner*—Nathan M. Nutter
*Attorney, Agent, or Firm*—William D. Sabo

[57] ABSTRACT

Disclosed is a solid binder composition containing from about 70 to about 98 percent by weight of TDI residue and correspondingly from about 2 to about 30 percent by weight of a select ester derived from a dicarboxylic acid. When the binder composition is used in making lignocellulosic composite materials, such as particle board, the ester acts as an effective internal mold release agent, facilitating release of the composite material from the mold.

30 Claims, No Drawings

SOLID TDI RESIDUE-DICARBOXYLIC ESTER BINDER COMPOSITION AND LIGNOCELLULOSIC COMPOSITE MATERIALS PREPARED THEREFROM

This invention relates to a binder composition, and, more particularly, to a solid binder composition derived from TDI residue. The invention also pertains to the use of the TDI residue-based binder composition in the preparation of lignocellulosic composite materials.

Toluene diisocyanate is produced on a large commercial scale by a process which comprises reacting toluene diamine with excess phosgene usually in the presence of an organic solvent medium. An illustrative process is disclosed in U.S. Pat. No. 3,287,387. Along with toluene diisocyanate, the phosgenation product mixture usually comprises unreacted phosgene, solvent, hydrogen chloride by-product and a relatively substantial proportion of side reaction products in the form of residual and high-boiling polymeric materials.

Recovery of a substantial or major proportion of toluene diisocyanate from this mixture is effected by distillation which is usually performed in two or more steps to enable removal of the low-boiling components, e.g., the unreacted phosgene and the solvent, first before recovering the toluene diisocyanate. The remaining residue from distillation is a viscous, fuming mixture which is difficult to transport or process. Thus, on being pumped out for underground burial or incineration, it becomes thicker and thicker presumably as a result of reaction with moisture and/or further polymerization. As such, it eventually plugs up the lines making it difficult, if not impossible, to continue the pumping operation. Additionally, because of the toxic fumes emanating therefrom, this residue poses an environmental problem. Thus, in processing it to underground burial, or incineration, or chemical treatment, special and costly steps must be taken to avoid polluting the atmosphere.

In an effort to recycle and productively use the toluene diisocyanate distillation residue, a number of processes have been developed in the art. For example, processes have been proposed for using TDI residue in the production of polyurethane compositions. It has also been taught that TDI residue can be used as a binder in the manufacture of lignocellulosic composite materials, such as particle board. Reference is made to U.S. Pat. Nos. 4,143,008 and 4,293,456. However, due to the strong adhesive characteristics of toluene diisocyanate, the composite materials so produced tend to adhere to the mold surfaces during the molding process. Consequently, the product can be severely damaged, and considerable effort and expense can be incurred in removing product from the mold surfaces.

This adherence problem is commonly encountered in the use of organic polyisocyanate-based binders in the production of lignocellulosic composite materials, and various approaches have been proposed in an effort to eliminate the problem. For instance, various additives have been incorporated into organic polyisocyanate-based binders to serve as internal mold release agents. For example, in U.S. Pat. No. 4,257,995, mono- or di-acid phosphates or pyrophosphates are added to reduce the adherence problem. Other additives include phosphates or thiophosphates (U.S. Pat. No. 4,257,996), phosphinic or phosphoric acids or phosphites (U.S. Pat. No. 4,352,696), organic sulfonic acids or hydrogen sulfates (U.S. Pat. No, 4,376,088) and mixtures of furfural and phosphates (U.S. Pat. No. 4,376,089).

Another approach involves applying various compounds to the mold surfaces to facilitate release. For example, in U.S. Pat. No. 4,110,397, a "metallic soap" is employed. In U.S. Pat. No. 4,374,791, the metallic surfaces of the mold are precoated with a layer of polytetrafluoroethylene.

For a variety of reasons, none of these techniques has proven to be entirely satisfactory.

It has now been discovered that an improvement can be achieved in TDI residue-based binder compositions by incorporation of a select ester. In the practice of the invention, a lignocellulosic composite material is produced which features a minimal tendency to adhere to the hot metal surfaces of the mold. As an additional feature, the ester functions in the binder composition as an inert wetting agent, which facilitates application of the binder composition, but does not diminish the binding properties of the TDI residue. When the binder composition is employed in the production of lignocellulosic composite materials, it has also been found that the esters tends to soften the lignocellulosic particles, rendering the particles easier to press.

The binder composition employed according to the present invention is prepared by mixing TDI residue and a select ester. In forming the mixture, from about 70 to about 98 percent by weight of TDI residue and correspondingly from about 2 to about 30 percent by mixture includes from about 80 to about 97 percent by weight of TDI residue and correspondingly from about 3 to about 20 percent by weight of the ester.

In forming the binder composition of the invention, any residue may be used resulting from the distillation of the product of phosgenating toluene diamine. As commonly used in the commercial production of toluene diisocyanate, the toluene diamine is typically made up of a mixture of 2,4- and 2,6-isomers and may in addition contain a minor proportion of ortho-toluene diamine. The distillation residue is usually a dark, viscous liquid which is substantially free of solvent. Along with varying amounts of phosgene, by-product hydrochloric acid, and a residual content, of at least about 25 percent and up to about 50 percent by weight of toluene diisocyanate, it usually contains a substantial amount, e.g., 30–70 percent by weight, of high boiling and tarry by-products of the phosgenation reaction.

Under some circumstances, it may be desired to reduce the hydrolyzable chlorine content of the TDI residue, prior to use in preparing the binder composition. This can be accomplished by employing a variety of techniques known to those skilled in the art. For example, the TDI residue can be heated to a temperature of about 120° to about 250° C. in the presence of about 0.05 to about 8 percent by weight, based on the weight of the TDI residue, of formic acid, according to the process of U.S. Pat. No. 3,887,502, the entire disclosure of which is incorporated herein by reference. The ester which is used to form the binder composition of the invention is derived from a dicarboxylic acid. Suitable esters include the following and mixtures thereof:
(a) saturated aliphatic dicarboxylic esters having the formula

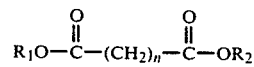

wherein $R_1$ and $R_2$ are independently selected from the group consisting of $C_1$-$C_{20}$ alkyl, $C_1$-$C_{20}$ haloalkyl and $C_1$-$C_{20}$ alkoxy and n is an integer ranging from 1-12, inclusive; (b) unsaturated aliphatic dicarboxylic esters having the formula

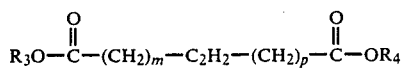

wherein $R_3$ and $R_4$ are independently selected from the group consisting of $C_1$-$C_{20}$ alkyl, $C_1$-$C_{20}$ haloalkyl and $C_1$-$C_{20}$ alkoxy and m and p are the same and each is an integer ranging from 1-10, inclusive; and (c) aromatic dicarboxylic esters having the formula

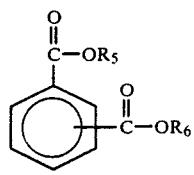

wherein $R_5$ and $R_6$ are independently selected from the group consisting of $C_1$-$C_{10}$ alkyl, $C_1$-$C_{10}$ haloalkyl and $C_1$-$C_{10}$ alkoxy and wherein the aromatic ring is otherwise unsubstituted or substituted with at least one member selected from the group consisting of halo and $C_1$-$C_4$ alkyl.

Preferred esters in each group listed above include the following and mixtures thereof: (a) saturated aliphatic dicarboxylic esters, wherein $R_1$ and $R_2$ are independently selected from the group consisting of $C_1$-$C_8$ alkyl, $C_1$-$C_8$ haloalkyl and $C_1$-$C_8$ alkoxy and n is an integer ranging from 1-8, inclusive; (b) unsaturated aliphatic dicarboxylic esters, wherein $R_3$ and $R_4$ are independently selected from the group consisting of $C_1$-$C_8$ alkyl, $C_1$-$C_8$ haloalkyl and $C_1$-$C_8$ alkoxy and m and p are the same and each is an integer ranging from 1-3, inclusive; and (c) aromatic dicarboxylic esters, wherein $R_5$ and $R_6$ are independently selected from the group consisting of $C_1$-$C_4$ alkyl, $C_1$-$C_4$ haloalkyl and $C_1$-$C_4$ alkoxy and wherein the aromatic ring is otherwise unsubstituted.

Particularly preferred esters are those derived from the following dicarboxylic acids: oxalic, malonic, succinic, glutaric, adipic, pimelic, suberic, azelaic, sebacic, maleic, fumaric, phthalic, isophthalic and terephthalic. The most preferred embodiments of the invention employ esters derived from dicarboxylic acids selected from the group consisting of succinic, glutaric and adipic.

The esters which are employed in forming the binder composition of the invention can be readily prepared by procedures well known in the art. For example, the corresponding dicarboxylic acid can be reacted with the appropriate alcohols or phenols. See Morrison, T. M. and Boyd, R. N., *Organic Chemistry* (3rd Edition), page 673 (1973). Illustratively, oxalic acid can be reacted with two moles of methanol to form dimethyl oxalate. Various esters such as diethyl phthalate and dibutyl maleate are commercially available. In one particularly preferred embodiment of the invention, a mixture of dimethyl succinate, dimethyl glutarate and dimethyl adipate, commercially available from E. I. duPont de Nemours & Co. under the designation "DBE", is employed.

To form the binder composition that is utilized according to the invention, the TDI residue is size reduced usually to an average particle size of less than about 600 microns. It is generally desirable to size reduce the TDI residue to an average particle size within this limit in order to insure that the binder composition will have uniform binding properties. Otherwise, larger particle sizes generally lead to localized regions of greater toluene diisocyanate concentration, and hence ultimately greater binding power. Preferably, the TDI residue has an average particle size of less than about 400 microns. To effect the size reduction, any suitable technique known to those skilled in the art may be employed. For example, dry grinding of the solid particles may be carried out using ball mills, baffle plate mills, pinned disc mills, air-stream mills, and so forth.

In preparing the binder composition, the ester may be added to the TDI residue, while in a liquid phase at elevated temperature or in a solid phase at ambient temperature. Also, the ester can be mixed with the TDI residue either before or after the size reduction step is carried out, as will be readily apparent to those skilled in the art.

To modify the properties of the binder composition, other ingredients may be added. For example, in one embodiment of the invention, the binder composition also includes a solid organic polyhydroxyl compound. Any suitable solid organic polyhydroxyl compound may be used including the following and mixtures thereof: monosaccharides, such as glucose, fructose, sorbose, mannose, galactose, and the like; disaccharides, such as sucrose, lactose, maltose, cellobiose, and the like; polysaccharides, such as starch, cellulose, dextrine, and the like; other carbohydrates, such as methyl glucoside, methoxy cellulose, carboxy methylcellulose, and so forth; aromatic compounds, such as resol, novolac, bisphenol A, resorcinol, etc.; and other polyfunctional compounds, such as tris (hydroxyethyl) isocyanurate, a resinous hydroxyl group-containing material derived from pine wood known commercially as "VINSOL", pentaerythritol, sorbitol, and so forth. When the binder composition is employed at elevated temperatures, such compounds will react with the TDI residue to form polyurethane compositions, which tend to impart a plasticization effect.

The binder composition also may contain a filler. Any suitable material known to those skilled in the art may be employed. Generally, a variety of materials may be utilized including: carbonates, e.g., sodium carbonate, potassium carbonate and calcium carbonate; phosphates, e.g., trisodium ortho-phosphate, sodium tripolyphosphtes and tetrasodium pyrophosphate; silicates, e.g., sodium metasilicate; sulfates, e.g., sodium sulfate and calcium sulfate; and so forth.

Various other additives known to those skilled in the art, such as viscosity modifiers, also may be included.

The described binder composition is used in the manufacture of lignocellulosic composite materials. The process of the invention is carried out by contacting a plurality of lignocellulosic particles with the described binder composition. The contacted particles are thereafter formed into a composite material by the application of heat and pressure.

Particles of any suitable lignocellulosic material may be employed according to the process of the invention. Illustrative materials containing lignocellulosic include: wood chips, wood fibers, planar shavings, sawdust, bark, cork and the like, as well as straw, flax, bagasse, bamboo, dried weeds and grasses, corn stalks, hulls from cereal crops such as rice and oats, sisal, and so forth. The moisture content of the lignocellulosic particles typically ranges from about 2 to about 25 percent, and preferably from about 8 to about 20 percent, by weight.

For purposes of illustration, the binder composition will be used to produce particle board in the description which follows. It is to be understood, however, that the binder composition can be suitably employed in the manufacture of any type of lignocellulosic composite material, such as, for example, chip board, wafer board, fiber board, etc., as will be readily apparent to those skilled in the art.

In the manufacture of particle board, the lignocellulosic particles may be conveniently contacted with the binder composition by mixing the particles with the binder composition while the particles are being blended or agitated in an enclosed blender or like mixing apparatus. Any suitable amount of the binder composition may be employed in making particle board according to the process of the invention. Generally speaking, the binder composition is used in a proportion ranging from about 2 to about 50 percent by weight based on the dry weight of the particles. For most applications, it is preferred to employ from about 5 to about 30 percent by weight of the binder composition. If desired, other standard materials, such as fire retardants, pigments, and the like, may also be added to the particles during the blending step.

The treated particles are blended sufficiently to form a uniform mixture, which is then formed into a loose mat or felt. The mat is subsequently placed in a heated press between caul plates and compressed to the desired extent. The actual pressing conditions, i.e. temperature, pressure and time, may vary over wide ranges and are generally dependent on the desired thickness and density of the board being produced, the size of the particles used and other factors familiar to those skilled in the art. In general, however, temperatures ranging from about 250° to about 450° F. and pressures ranging from about 400 to about 800 psi for a period of about 3 to about 8 minutes are typical.

The above-described process can be carried out batchwise or in a continuous manner, as should be readily apparent to those skilled in the art. Either way, a particle board is produced demonstrating a minimal tendency to adhere to the metal surfaces of the press. It is also within the scope of the invention to apply a release agent to the metal surfaces of the press before a manufacturing run is commenced, if desired. This may aid in insuring that no adherence or negligible adherence of the particle board to the metal surfaces takes place. Any material known to those in the art as being suitable as a release agent may be employed, e.g. iron, calcium or zinc stearate compounds.

The binder composition of the present invention may also be used in conjunction with conventional thermosetting resin binders, such as phenol-formaldehyde, resorcinol-formaldehyde, melamine-formaldehyde, urea-formaldehyde, urea-furfural, and the like. Combinations of this type can be particularly useful in the preparation of certain laminated boards. For example, the binder composition of the present invention may be used in one or more inner layers while the conventional binder is added to the outer layers. Such combinations avoid the problems of adhesion normally encountered with polyisocyanate-based binders, while providing a product having internal strength properties substantially improved over products obtained from the use of conventional resins alone.

Other modifications should be readily apparent to those skilled in the art. For example, it is also possible to use various ingredients which influence polyurethane formation in combination with the binder composition of the invention. If desired, common urethane catalysts, such as tertiary amines, may be added to promote the chemical reaction between the TDI residue and the lignocellulosic material. This may result in shorter press times or lower molding temperatures.

The lignocellulosic composite materials produced in accordance with the invention have excellent physical properties and may be used in any of the customary areas of application for such materials.

The following examples are provided to illustrate the invention. The toluene diisocyanate distillation residue which is referred to and used throughout the examples was obtained by a conventional method, as described, for example, in U.S. Pat. No. 3,287,387, for the commercial production of toluene diisocyanate. More specifically, this method involves (a) reacting, at about 125° C., excess phosgene with a solution of toluene diamine (mixture of 2,4- and 2,6-isomers) in monochlorobenzene (MCB) solvent, (b) removing the MCB, and most of the unreacted phosgene and by-product HCl from the phosgenation product, and (c) further distilling the remaining product to recover overhead pure toluene diisocyanate. The residue from this distillation, which contains about 30–40 percent by weight of residual toluene diisocyanate, is used in the examples.

Further in the examples, all parts and percentages are by weight unless otherwise specified. The physical properties were determined in accordance with ASTM D1037.

PREPARATION OF BINDER COMPOSITION

Examples 1–3

80 Parts of solid TDI residue (% NCO: 26.80) and 20 parts of an ester composition[1] were mixed together. This mixture was ball milled, and the pulverized mixture was then passed through a screen with 0.0165 in. (0.420 mm) openings. The resulting TDI residue-ester composition mixture was subsequently blended with additional pulverized TDI residue to form two additional mixtures for use in preparing particle boards. The compositions of the various mixtures are summarized below:

| Example | Component (Parts by Weight) | |
|---|---|---|
| | TDI Residue | Ester Composition |
| 1 | 80 | 20 |
| 2 | 90 | 10 |
| 3 | 95 | 5 |

[1]Commercially available from E. I. duPont de Nemours & Co. under the designation "DBE", understood as consisting of a mixture of dimethyl succinate, dimethyl glutarate and dimethyl adipate.

PREPARATION OF PARTICLE BOARD

Example 4

279.41 Grams of wood chips[1] were charged to a laboratory rotating drum blender. 21.60 Grams of the binder composition of Example 1 were then added to the blender, and the resulting mixture was blended for 10 minutes. The blended mixture was formed into a square mat (8.3"×8.3") on a square sheet of aluminum foil (8.3"×8.3"), and a second, identical sheet of aluminum foil was then placed over the mat. The mat/aluminum foil assembly was placed between the aluminum platens of a compression molding machine, the platens having been preheated to a temperature of 350° F. The mat was subjected to a molding temperature of 350° F. and a pressure of 700 psi. After 8 minutes, the pressure was released and the particle board was demolded and cut into specimens for physical testing.

[1] Obtained from Elmendorf Board Corporation, Claremont, N.H., understood as consisting of 70% pine wood and 30% aspen wood (moisture content: 3.5%, particle size: strands ranging in length from about (¼"-2½").

The particle board was demolded without demonstrably sticking to the mold platens. The physical appearance of the particle board was excellent. The composition and physical properties of the particle board are summarized in Table I below.

Examples 5 and 6

The procedure of Example 4 was repeated except with the following changes. The binder compositions of Examples 2 and 3 were employed in Examples 5 and 6, respectively, in place of the binder composition of Example 1. In addition, in Example 5, a different type of wood chips[1] was used, and the mat was formed on a sheet of mild steel (8.3"×8.3"), instead of aluminum.

[1] Commercially available from Wilner Wood Products Co., Norway, Me., under the designation "PINE DRI", understood as consisting of white pine wood (moisture content: 3.5%, particle size: 8-20 mesh).

The particle boards were demolded without demonstrably sticking to the mold platens. The physical appearance of the particle boards was excellent. The composition and physical properties of the particle boards are summarized in Table I below.

Comparative Example A

For purposes of comparison, the procedure of Example 4 was repeated using as the binder composition pulverized TDI residue. Additionally, a different type of wood chips[1] was employed. The results showed that the particle board adhered to the mold platens to an unacceptable degree. The composition and physical properties of the particle board are summarized in Table I below.

[1] Commercially available from Wilner Wood Products Co., Norway, Me., under the designation "PINE DRI", understood as consisting of white pine wood (moisture content: 3.5%, particle size: 8-20 mesh).

TABLE I

|  | Example | | | Comparative Example |
|---|---|---|---|---|
|  | 4 | 5 | 6 | A |
| Wood chips[1], grams | 279.41 | — | 279.41 | — |
| Wood chips[2], grams | — | 279.41 | — | 279.41 |
| Moisture content, percent | 3.5 | 3.5 | 3.5 | 3.5 |
| Binder composition, Example or Comparative Example | 1 | 2 | 3 | A |
| Binder composition, grams | 21.60 | 21.60 | 21.60 | 21.60 |
| Molding composition, grams | 301.01 | 301.01 | 301.01 | 301.01 |
| Molding conditions: | | | | |
| Temperature, °F. | 350 | 350 | 350 | 350 |
| Pressure, psi | 700 | 700 | 700 | 700 |
| Time, minutes | 8 | 8 | 8 | 8 |
| Mold plate, compt. | | | | |
| Top | Al. Foil | Al. Foil | Al. Foil | Al. Foil |
| Bottom | Al. Foil | Mild Steel | Al. Foil | Al. Foil |
| Sticking to mold platens | No | No | No | Yes |
| Physical Properties | | | | |
| Thickness, inches | 0.395 | 0.376 | 0.385 | 0.381 |
| Density, pcf | 43.9 | 45.6 | 41.10 | 44.4 |
| Internal bonding, psi | 64.4 | 78.3 | 82.1 | 80.8 |
| % Thickness swell after soaking in water for 24 hours | 49.80 | 54.60 | 54.60 | 54.00 |

[1] Obtained from Elmendorf Board Corporation, Claremont, New Hampshire, understood as consisting of 70% pine wood and 30% aspen wood (moisture content: 3.5%, particle size: strands ranging in length from about ¼"-2½").
[2] Commercially available from Wilner Wood Products Co., Norway, Maine, under the designation "PINE DRI", understood as consisting of white pine wood (moisture content: 3.5%, particle size: 8-20 mesh).

PREPARATION OF BINDER COMPOSITION

Example 7

82 Parts of solid TDI residue, 6 parts of composition[1] were mixed together and melted at 100° C. Upon cooling to room temperature, the mixture solidified. 46 Grams of a polyhydroxy compound[2] were added, and the resulting mixture was ball milled into a homogeneous mixture, which was then passed through a screen with 0.0165 in. (0.420 mm) openings. The composition of the resulting binder composition is summarized below:

| Component | Parts by Weight |
|---|---|
| TDI residue | 59.1 |
| Calcium carbonate | 27.3 |
| Polyhydroxy compound | 4.5 |
| Ester composition | 9.1 |

[1] Commercially available from E. I. duPont de Nemours & Co. under the designation "DBE", understood as consisting of a mixture of dimethyl succinate, dimethyl glutarate and dimethyl adipate.
[2] An extract of pine wood, commercially available from Hercules, Inc., Wilmington, Delaware, under the designation "VINSOL".

PREPARATION OF PARTICLE BOARD

Example 8

184.8 Grams of wood chips[1] were charged to a laboratory rotating drum blender. 18.6 Grams of the binder composition of Example 7 were then added to the blender, and the resulting mixture was blended for 10 minutes. The blended mixture was formed into a square mat (8.3"×8.3") on a square aluminum plate (8.3"×8.3"), and a second, identical aluminum plate was then placed over the mat. The mat/aluminum plate assembly was placed between the aluminum platens of a compression molding machine, the platens having been preheated to a temperature of 280° F. The mat was subjected to a molding temperature of 280° F. and a pressure of 700 psi. After 5 minutes, the pressure was released and the particle board was demolded and cut into specimens for physical testing.

[1] Commercially available from Wilner Wood Products Co., Norway, Me., under the designation "PINE DRI", understood as consisting of white pine wood (moisture content: 9.0%, particle size: 8-20 mesh).

The particle board was demolded without demonstrably sticking to the mold platens. The physical appearance of the particle board was excellent. The composition and physical properties of the particle board are summarized in Table II below.

Comparative Examples B and C

For purposes of comparison, the procedure of Example 8 was repeated except with the following changes. In Comparative Example B, the binder composition was pulverized TDI residue, and, in Comparative Example C, the binder composition was a pulverized mixture of 73 parts residue and 27 parts of a polyhydroxy compound[1]. The results showed that the particle boards of these two comparative examples adhered to the mold platens to an unacceptable degree. The composition and physical properties of the particle boards are summarized in Table II below.

[1] An extract of pine wood, commercially available from Hercules, Inc., Wilmington, Del., under the designation "VINSOL".

TABLE II

| | Example | Comparative Example | |
|---|---|---|---|
| | 8 | B | C |
| Wood chips[1], grams | 184.8 | 184.8 | 191 |
| Moisture content, percent | 9.0 | 9.0 | 9.0 |
| Binder composition, Example or Comparative Example | 7 | B | C |
| Binder composition, grams | 18.6 | 18.6 | 21.0 |
| Molding composition, grams | 203.4 | 203.4 | 212 |
| Molding conditions: | | | |
| Temperature, °F. | 280 | 280 | 280 |
| Pressure, psi | 700 | 700 | 700 |
| Time, minutes | 5 | 5 | 5 |
| Mold plate, compt. | | | |
| Top | Aluminum | Aluminum | Aluminum |
| Bottom | Aluminum | Aluminum | Aluminum |
| Sticking to mold platens | No | Very sticky | Sticky |

[1] Commercially available from Wilner Wood Products Co., Norway, Maine, under the designation "PINE DRI", understood as consisting of white pine wood (moisture content: 9%, particle size: 8-20 mesh).

Example 9

184.6 Grams of wood chips[1] were charged to a laboratory rotating drum blender. 18.7 Grams of the binder composition of Example 7 were then added to the blender, and the resulting mixture was blended for 10 minutes. The blended mixture was formed into a square mat (8.3"×8.3") on a square aluminum plate (8.3"×8.3"), and a second, identical aluminum plate was then placed over the mat. The mat/aluminum plate assembly was placed between the aluminum platens of a compression molding machine, the platens having been preheated to a temperature of 250° F. The mat was subjected to a molding temperature of 250° F. and a pressure of 700 psi. After 5 minutes, the pressure was released and the particle board was demolded and cut into specimens for physical testing.

[1] Obtained from Wilner Wood Products Co., Normay, Me., understood as consisting of maple wood (moisture content: 8.5%, particle size: 8-14 mesh).

The particle board was demolded without demonstrably sticking to the mold platens. The physical appearance of the particle board was excellent. The composition and physical properties of the particle board are summarized in Table III below.

Comparative Examples D and E

For purposes of comparison, the procedure of Example 9 was repeated except with the following changes. In Comparative Example D, the binder composition was pulverized TDI residue. In Comparative Example E, the binder composition was a pulverized mixture of 73 parts of TDI residue and 27 parts of a polyhydroxy compound[1]; and additionally, the molding composition and the molding conditions were slightly varied as shown in Table III below. The results showed that the particle boards of these two comparative examples adhered to the mold platens to an unacceptable degree. The composition and physical properties of the particle boards are summarized in Table III below.

[1] An extract of pine wood, commercially available from Hercules, Inc., Wilmington, Del., under the designation "VINSOL".

TABLE III

| | Example | Comparative Example | |
|---|---|---|---|
| | 9 | D | E |
| Wood chips[1], grams | 184.6 | 184.6 | 192.5 |
| Moisture content, percent | 8.5 | 8.5 | 8.5 |
| Binder composition, grams | 18.7 | 18.7 | 19.5 |
| Molding composition, grams | 203.4 | 203.4 | 212 |
| Molding conditions: | | | |
| Temperature, °F. | 250 | 280 | 280 |
| Pressure, psi | 700 | 700 | 700 |
| Time, minutes | 5 | 5 | 5 |
| Mold plate, compt. | | | |
| Top | Aluminum | Aluminum | Aluminum |
| Bottom | Aluminum | Aluminum | Aluminum |
| Sticking to mold platens | No | Very sticky | Sticky |

[1] Obtained from Wilner Wood Products Co., Norway, Maine, understood as consisting of maple wood (moisture content: 8.5%, particle size: 8-14 mesh).

What is claimed is:

1. A solid binder composition comprising a mixture of from about 70 to about 98 percent by weight of TDI residue and correspondingly from about 2 to about 30 percent by weight of an ester derived from a dicarboxylic acid, said TDI residue being obtained from the distillation of the product of phosgenating toluene diamine to the corresponding toluene diisocyanate, and said ester being selected from the group consisting of
   (a) saturated aliphatic dicarboxylic esters having the formula

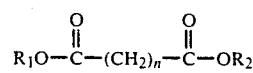

wherein $R_1$ and $R_2$ are independently selected from the group consisting of $C_1$-$C_{20}$ alkyl, $C_1$-$C_{20}$ haloalkyl and $C_1$-$C_{20}$ alkoxy and n is an integer ranging from 1-12, inclusive;
   (b) unsaturated aliphatic dicarboxylic esters having the formula

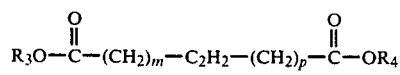

wherein $R_3$ and $R_4$ are independently selected from the group consisting of $C_1$-$C_{20}$ alkyl, $C_1$-$C_{20}$ haloalkyl and $C_1$-$C_{20}$ alkoxy and m and p are the same and each is an integer ranging from 1-10, inclusive;

(c) aromatic dicarboxylic esters having the formula

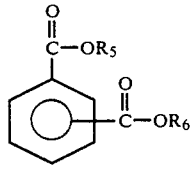

wherein $R_5$ and $R_6$ are independently selected from the group consisting of $C_1$-$C_{10}$ alkyl, $C_1$-$C_{10}$ haloalkyl and $C_1$-$C_{10}$ alkoxy and wherein the aromatic ring is otherwise unsubstituted or substituted with at least one member selected from the group consisting of halo and $C_1$-$C_4$ alkyl; and (d) mixtures thereof.

2. The composition of claim 1, wherein said ester is selected from the group consisting of
(a) saturated aliphatic dicarboxylic esters, wherein $R_1$ and $R_2$ are independently selected from the group consisting of $C_1$-$C_8$ alkyl, $C_1$-$C_8$ haloalkyl and $C_1$-$C_8$ alkoxy and n is an integer ranging from 1-8, inclusive;
(b) unsaturated aliphatic dicarboxylic esters, wherein $R_3$ and $R_4$ are independently selected from the group consisting of $C_1$-$C_8$ alkyl, $C_1$-$C_8$ haloalkyl and $C_1$-$C_8$ alkoxy and m and p are the same and each is an integer ranging from 1-3, inclusive;
(c) aromatic dicarboxylic esters, wherein $R_5$ and $R_6$ are independently selected from the group consisting of $C_1$-$C_4$ alkyl, $C_1$-$C_4$ haloalkyl and $C_1$-$C_4$ alkoxy and wherein the aromatic ring is otherwise unsubstituted; and
(d) mixtures thereof.

3. The composition of claim 2, wherein said ester is derived from a dicarboxylic acid selected from the group consisting of oxalic, malonic, succinic, glutaric, adipic, pimelic, suberic, azelaic, sebacic, maleic, fumaric, phthalic, isophthalic and terephthalic.

4. The composition of claim 3, wherein said ester is derived from a dicarboxylic acid selected from the group consisting of succinic, glutaric and adipic.

5. The composition of claim 1, wherein said TDI residue has a residual content from about 25 to about 50 percent by weight of toluene diisocyanate.

6. The composition of claim 5, wherein said TDI residue has an average particle size of less than about 400 microns.

7. The composition of claim 1, including at least one of a solid organic polyhydroxyl compound and a filler.

8. The composition of claim 1, wherein there is employed in said mixture from about 80 to about 97 percent by weight of said TDI residue and correspondingly from about 3 to about 20 percent by weight of said ester, and wherein said ester is derived from a dicarboxylic acid selected from the group consisting of oxalic, malonic, succinic, glutaric, adipic, pimelic, suberic, azelaic, sabacic, maleic, fumaric, phthalic, isophthalic and terephthalic.

9. The composition of claim 8, wherein said ester is derived from a dicarboxylic acid selected from the group consisting of succinic, glutaric and adipic.

10. The composition of claim 9, wherein said TDI residue has a residual content from about 25 to about 50 percent by weight of toluene diisocyanate and an average particle size of less than about 400 microns.

11. A process for the preparation of a lignocellulosic composite material, comprising the steps of: contacting a plurality of lignocellulosic particles with a solid binder composition; and then forming said contacted particles into a composite material by the application of heat and pressure, said binder composition comprising a mixture of from about 70 to about 98 percent by weight of TDI residue and correspondingly from about 2 to about 30 percent by weight of an ester derived from a dicarboxylic acid, said TDI residue being obtained from the distillation of the product of phosgenating toluene diamine to the corresponding toluene diisocyanate, and said ester being selected from the group consisting of (a) saturated aliphatic dicarboxilic esters having the formula

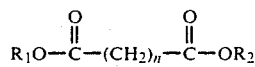

wherein $R^1$ and $R_2$ are independently selected from the group consisting of $C_1$-$C_{20}$ alkyl, $C_1$-$C_{20}$ haloalkyl and $C_1$-$C_{20}$ alkoxy and n is an integer ranging from 1-12, inclusive;

(b) unsaturated aliphatic dicarboxylic esters having the formula

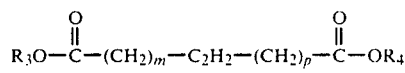

wherein $R_3$ and $R_4$ are independently selected from the group consisting of $C_1$-$C_{20}$ alkyl, $C_1$-$C_{20}$ haloalkyl and $C_1$-$C_{20}$ alkoxy and m and p are the same and each is an integer ranging from 1-10, inclusive;

(c) aromatic dicarboxic esters having the formula

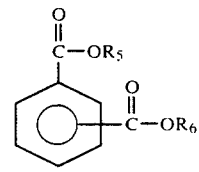

wherein $R_5$ and $R_6$ are independently selected from the group consisting of $C_1$-$C_{10}$ alkyl, $C_1$-$C_{10}$ haloalkyl and $C_1$-$C_{10}$ alkoxy and wherein the aromatic ring is otherwise unsubstituted or substituted with at least one member selected from the group consisting of halo and $C_1$-$C_4$ alkyl; and (d) mixtures thereof.

12. The process of claim 11, wherein there is employed from about 2 to about 50 percent by weight, based on the dry weight of said lignocellulosic particles, of said binder composition.

13. The process of claim 12, wherein there is employed from about 5 to about 30 percent by weight, based on the dry weight of said lignocellulosic particles, of said binder composition.

14. The process of claim 11, wherein said ester is selected from the group consisting of
(a) saturated aliphatic dicarboxylic esters, wherein $R_1$ and $R_2$ are independently selected from the group consisting of $C_1$-$C_8$ alkyl, $C_1$-$C_8$ haloalkyl and $C_1$–$C_8$ alkoxy and n is an integer ranging from 1–8, inclusive;

(b) unsaturated aliphatic dicarboxylic esters, wherein $R_3$ and $R_4$ are independently selected from the group consisting of $C_1$–$C_8$ alkyl, $C_1$–$C_8$ haloalkyl and $C_1$–$C_8$ alkoxy and m and p are the same and each is an integer ranging from 1–3, inclusive;

(c) aromatic dicarboxylic esters, wherein $R_5$ and $R_6$ are independently selected from the group consisting of $C_1$–$C_4$ alkyl, $C_1$–$C_4$ haloalkyl and $C_1$–$C_4$ alkoxy and wherein the aromatic ring is otherwise unsubstituted; and (d) mixtures thereof.

15. The process of claim 14, wherein said ester is derived from a dicarboxylic acid selected from the group consisting of oxalic, malonic, succinic, glutaric, adipic, pimelic, suberic, azelaic, sebacic, maleic, fumaric, phthalic, isophthalic and terephthalic.

16. The process of claim 15, wherein said ester is derived from a dicarboxylic acid selected from the group consisting of succinic, glutaric and adipic.

17. The process of claim 11, wherein said TDI residue has a residual content from about 25 to about 50 percent by weight of toluene diisocyanate.

18. The process of claim 17, wherein said TDI residue has an average particle size of less than about 400 microns.

19. The process of claim 11, including at least one of a solid organic polyhydroxyl compound and a filler.

20. The process of claim 11, wherein there is employed in said mixture from about 80 to about 97 percent by weight of said TDI residue and correspondingly from about 3 to about 20 percent by weight of said ester, and wherein said ester is derived from a dicarboxylic acid selected from the group consisting of oxalic, malonic, succinic, glutaric, adipic, pimelic, suberic, azelaic, sebacic, maleic, fumaric, phthalic, isophthalic and terephthalic.

21. The process of claim 20, wherein there is employed from about 5 to about 30 percent by weight, based on the dry weight of said lignocellulosic particles, of said binder composition.

22. The process of claim 21, wherein said ester is derived from a dicarboxylic acid selected from the group consisting of succinic, glutaric and adipic.

23. The process of claim 22, wherein said TDI residue has a residual content from about 25 to about 50 percent by weight of toluene diisocyanate and an average particle size of less than about 400 microns.

24. The process of claim 23, wherein said lignocellulosic particles are wood chips and said lignocellulosic composite material is wood particle board.

25. A lignocellulosic composite material prepared according to the process of claim 11.

26. A lignocellulosic composite material prepared according to the process of claim 16.

27. A lignocellulosic composite material prepared according to the process of claim 19.

28. A lignocellulosic composite material prepared according to the process of claim 20.

29. A lignocellulosic composite material prepared according to the process of claim 22.

30. A lignocellulosic composite material prepared according to the process of claim 24.

* * * * *

UNITED STATES PATENT AND TRADEMARK OFFICE
CERTIFICATE OF CORRECTION

PATENT NO. : 4,490,517
DATED : December 25, 1984
INVENTOR(S) : Stephen Fuzesi and Robert W. Brown It is certified that error appears in the above-identified patent and that said Letters Patent is hereby corrected as shown below:

Column 2, line 29, after "by" insert --weight of the ester are employed. Preferably, the--.

Column 2, line 58, after "reference." a new paragraph should begin.

Column 9, line 23, after "73 parts" insert --of TDI--.

Column 10, line 1, delete "Normay" and insert --Norway--.

Column 12, line 17, delete "dicarboxilic" and insert --dicarboxylic--.

Column 12, line 24, delete "$R^1$" and insert --$R_1$--.

Column 12, line 39, delete "dicarboxic" and insert --dicarboxylic--.

Signed and Sealed this

Eleventh Day of June 1985

[SEAL]

Attest:

DONALD J. QUIGG

Attesting Officer   Acting Commissioner of Patents and Trademarks